United States Patent [19]
Kreuter

[11] Patent Number: 6,009,861
[45] Date of Patent: Jan. 4, 2000

[54] METHOD OF IMPROVING THE COMBUSTION CHARACTERISTICS IN AN INTERNAL COMBUSTION ENGINE

[75] Inventor: Peter Kreuter, Aachen, Germany

[73] Assignee: Meta Motoren und Energie-Technik GmbH, Germany

[21] Appl. No.: 08/923,493

[22] Filed: Sep. 4, 1997

[30] Foreign Application Priority Data

Sep. 4, 1996 [DE] Germany .......................... 196 35 886

[51] Int. Cl.⁷ .................................................. F02M 25/07
[52] U.S. Cl. ...................................................... 123/568.14
[58] Field of Search ............................. 123/568.14, 301, 123/302, 306, 308

[56] References Cited

U.S. PATENT DOCUMENTS

| | | | |
|---|---|---|---|
| 1,952,881 | 3/1934 | Minter | 123/568.14 |
| 3,507,261 | 4/1970 | Myers et al. | 123/568.14 |
| 4,424,790 | 1/1984 | Curtil | 123/568.14 |
| 4,732,116 | 3/1988 | Tanahashi et al. | 123/568.14 |
| 4,732,117 | 3/1988 | Tanahashi et al. | 123/568.14 |
| 4,732,118 | 3/1988 | Tanahashi et al. | 123/568.14 |

FOREIGN PATENT DOCUMENTS

| | | |
|---|---|---|
| 2125368 | 12/1971 | Germany . |
| 3800651 | 7/1988 | Germany . |

*Primary Examiner*—Willis R. Wolfe
*Attorney, Agent, or Firm*—Robert W. Becker & Associates

[57] ABSTRACT

In a method of improving the combustion characteristics in an internal combustion engine having a cylinder and a piston therein defining a combustion chamber, an inlet valve for temporarily communicating the combustion chamber with an induction system and an exhaust valve for temporarily communicating the combustion chamber with an exhaust gas system, the exhaust valve is partially opened at least during a part of the working cycle during which the pressure in the region of the combustion chamber, that adjoins the exhaust valve, is lower than the pressure in the region of the exhaust gas system, that adjoins the exhaust valve. The flow passage formed by the partial opening of the exhaust valve along the seat thereof is of such a configuration that an exhaust gas backflow which occurs through it flows in directed fashion into the combustion chamber.

7 Claims, 2 Drawing Sheets

METHOD OF IMPROVING THE COMBUSTION CHARACTERISTICS IN AN INTERNAL COMBUSTION ENGINE

FIELD OF THE INVENTION

The invention concerns a method of improving the combustion characteristics in an internal combustion engine, and an internal combustion engine.

BACKGROUND OF THE INVENTION

Increasingly strict exhaust gas regulations and the need to reduce the level of fuel consumption are setting high requirements in terms of the management and control systems for the operating characteristics of internal combustion engines or influencing the combustion characteristics in such engines.

A common method of improving the operating characteristics of or the combustion characteristics in internal combustion piston engines in the part-load range involves causing the fresh charge, in the part-load range, to flow into the combustion chamber in a directed manner in such a way that a swirl flow (rotational flow about the axis of the piston movement) and/or a tumble flow (rotational flow about an axis which is perpendicular to the direction of the piston movement) is formed in the combustion chamber. That is achieved by the incorporation of screening means in the inlet duct, by rendering inoperative an inlet valve when there are a plurality of inlet valves in each cylinder, and so forth. Such measures are intended to achieve an increased charge movement which improves the mixture formation and thus permits better combustion.

SUMMARY OF THE INVENTION

An object of the present invention is to improve the operating characteristics of an internal combustion piston engine, more especially in the part-load range thereof.

Another object of the present invention is to provide a method of enhancing the combustion characteristics in the combustion chamber of an internal combustion engine such as to afford improved fuel consumption and reduced emission levels, using a simple structural configuration.

A further object of the invention is an internal combustion engine which by virtue of relatively minor structural modifications enjoys an improved combustion performance.

In accordance with the present invention, the foregoing and other objects are attained by a method of improving the combustion characteristics in an internal combustion engine having a cylinder in which there operates a piston which adjoins a combustion chamber, with an inlet valve for temporarily or selectively communicating the combustion chamber with an induction system, and an exhaust valve for temporarily or selectively communicating the combustion chamber with an exhaust gas system. The exhaust valve is partially opened at least during a part of the working cycle during which the pressure in the region of the combustion chamber that adjoins the exhaust valve is lower than the pressure in the region of the exhaust gas system that adjoins the exhaust valve. The flow passage formed by the partial opening of the exhaust valve along its seat is of such a configuration that an exhaust gas backflow which occurs through same flows in a directed fashion into the combustion chamber.

As will be seen from a description of a preferred embodiment hereinafter the method according to the invention provides that the exhaust gas backflow which occurs during a part of the working cycle is utilised alone or additionally to form a directed flow in the combustion chamber, which improves the thermodynamic combustion conditions for fresh charge which flows into the combustion chamber when the inlet valve is opened. In that case, the kinetic energy of the fresh charge can be increased, more intensive mixing of the fresh charge with exhaust gas can be achieved, a film of fuel which is deposited on the combustion chamber wall can be broken up, and so forth.

A preferred feature of the method according to the invention provides that the exhaust gas backflow forms in the combustion chamber a flow which is near to the wall and which rotates about an axis. In that way it is possible to create an exhaust gas envelope which is near the wall and which has a desirable influence on combustion.

A further preferred feature of the method according to the invention provides that the exhaust gas backflow forms in the combustion chamber a swirl flow which extends around the axis of the cylinder. This is particularly advantageous as such a swirl flow forms a stable macroscopic rotational flow which is near the wall and in the core region of which fresh charge can be concentrated, the sparkplug normally being arranged in that core region in the case of Otto-cycle engines.

In a preferred embodiment of the invention fresh charge is introduced into a radially inner region of the swirling exhaust gas backflow and at the time of combustion is separated from the combustion chamber wall by a layer of exhaust gas. This provides that the fresh charge is "packed" into an exhaust gas envelope, by virtue of the exhaust gas backflow which lies against the combustion chamber wall surface forming an exhaust gas layer which separates the incoming or burning fresh charge from the combustion chamber wall. As a result thereof, the capability of operating with a lean mixture and the residual gas compatibility are improved, the levels of hydrocarbon emissions are reduced and the wall heat losses or cooling heat losses are reduced, which results in advantages in terms of consumption. The exhaust gas layer which is adjacent the wall can already come to rest at the time of combustion of the fresh charge or just prior to that time, in other words, the kinetic energy of the rotational flow can be dissipated.

In accordance with another aspect of the invention the foregoing and other objects are attained by an internal combustion engine comprising a cylinder in which there operates a piston which defines a combustion chamber, an inlet valve for temporarily communicating the combustion chamber with an induction system, and an exhaust valve for temporarily communicating the combustion chamber with an exhaust gas system. The engine includes a means for controlling opening and closing of the valves whereby the exhaust valve is partially opened at least during a part of the working cycle during which the pressure in the region of the combustion chamber that adjoins the exhaust valve is lower than the pressure in the region of the exhaust gas system that adjoins the exhaust valve, while the flow passage formed by the partial opening of the exhaust valve along the seat thereof is such that the exhaust gas backflow which occurs through it flows in a directed fashion into the combustion chamber.

In a preferred form of the internal combustion engine the exhaust valve seat is provided over a part of its periphery with a screening means which reduces the through-flow cross-section when there is a short valve lift, wherein the screening means faces generally in a peripheral direction of the combustion chamber, which peripheral direction is directed about the axis of the piston movement.

Another preferred feature provides that the internal combustion engine has first and second exhaust valves for the or each cylinder, each having a respective exhaust valve seat, the screening means of which face in the same direction in the peripheral direction.

With the above-outlined fundamental structure of an internal combustion engine of the invention, the method of the invention necessarily takes place in that internal combustion engine.

Further objects, features and advantages of the invention will be apparent from the following description of a preferred embodiment.

DESCRIPTION OF THE PREFERRED EMBODIMENT

Figure 1:
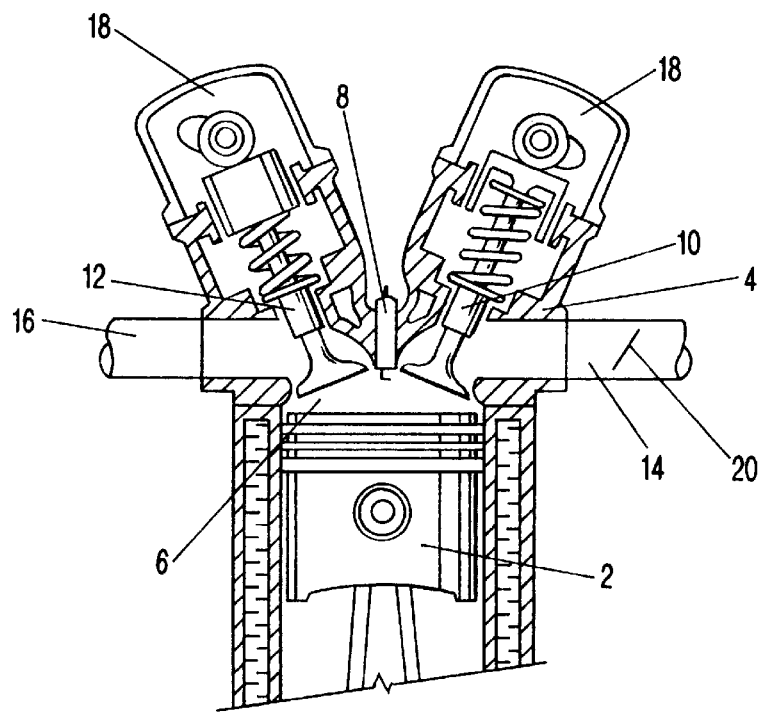
FIG. 1 is a view in cross-section through a butterfly valve-controlled reciprocating-piston internal combustion engine.

Referring to FIG. 1 an internal combustion engine has at least one piston as indicated at 2 operating in a respective cylinder, defining a combustion chamber 6 which is provided in a cylinder head 4 and into which a sparkplug 8 extends centrally from above. The charge change is controlled by way of one or more inlet valves as at 10 and one or more exhaust valves as at 12 which temporarily or selectively controlledly communicate the combustion chamber 6 with an induction system 14 and an exhaust gas system 16 respectively. The valves 10 and 12 are controlled by a cam drive arrangement 18 co-operating with the crankshaft (not shown) of the internal combustion engine.

Figure 2:
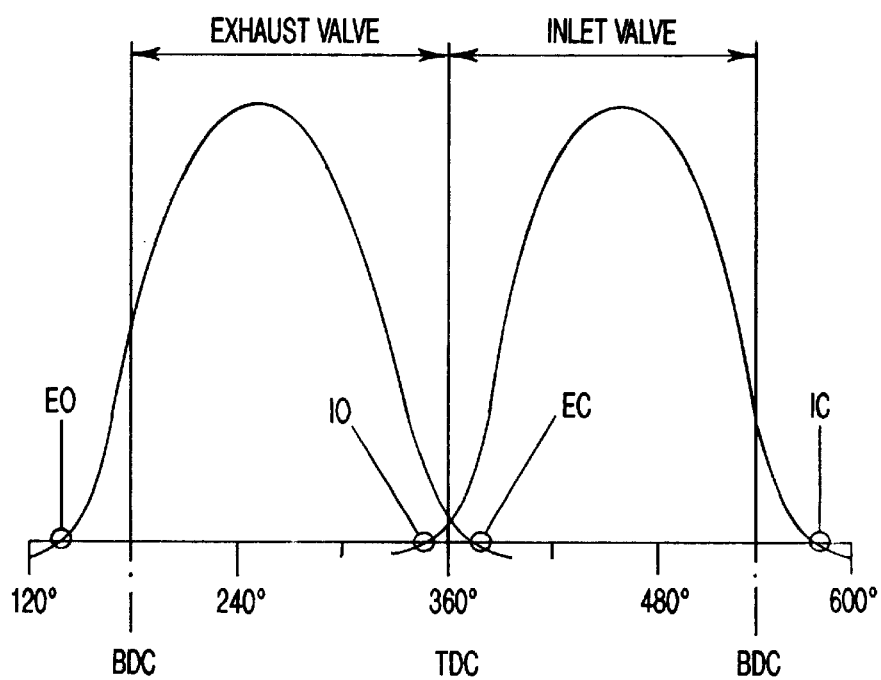
FIG. 2 shows the valve lift curves of the internal combustion engine shown in FIG. 1.

FIG. 2 shows on the abscissa the angular position of the crankshaft (not shown) while on the ordinate it shows the associated openings of the exhaust valve 12 and the inlet valve 10 respectively. As will be seen from FIG. 2, opening of the exhaust valve begins at about 130° crank angle (EO), in which case the exhaust valve 12 is already comparatively wide open in the region of the bottom dead centre (BDC) of the crankshaft and closes after the top dead centre (TDC) of the crankshaft (at EC). The inlet valve 10 opens before the top dead centre of the crankshaft (at IO) and closes after the bottom dead centre of the crankshaft (at IC).

As can be seen the inlet valve 10 already opens while the exhaust valve 12 is still open. In the range of high reduced pressures in the induction system 14, as are achieved when the butterfly valve 20 (FIG. 1) is substantially closed, that valve overlap has the result that the reduced pressure downstream of the butterfly valve 20 in the induction system 14 is extended into the combustion chamber 6 and further increased therein when the piston 2 has moved beyond the top dead centre point, whereby there is a backflow of exhaust gas out of the exhaust gas system 16 along the exhaust valve 12, which is still partially open, into the combustion chamber 6.

Figure 3:
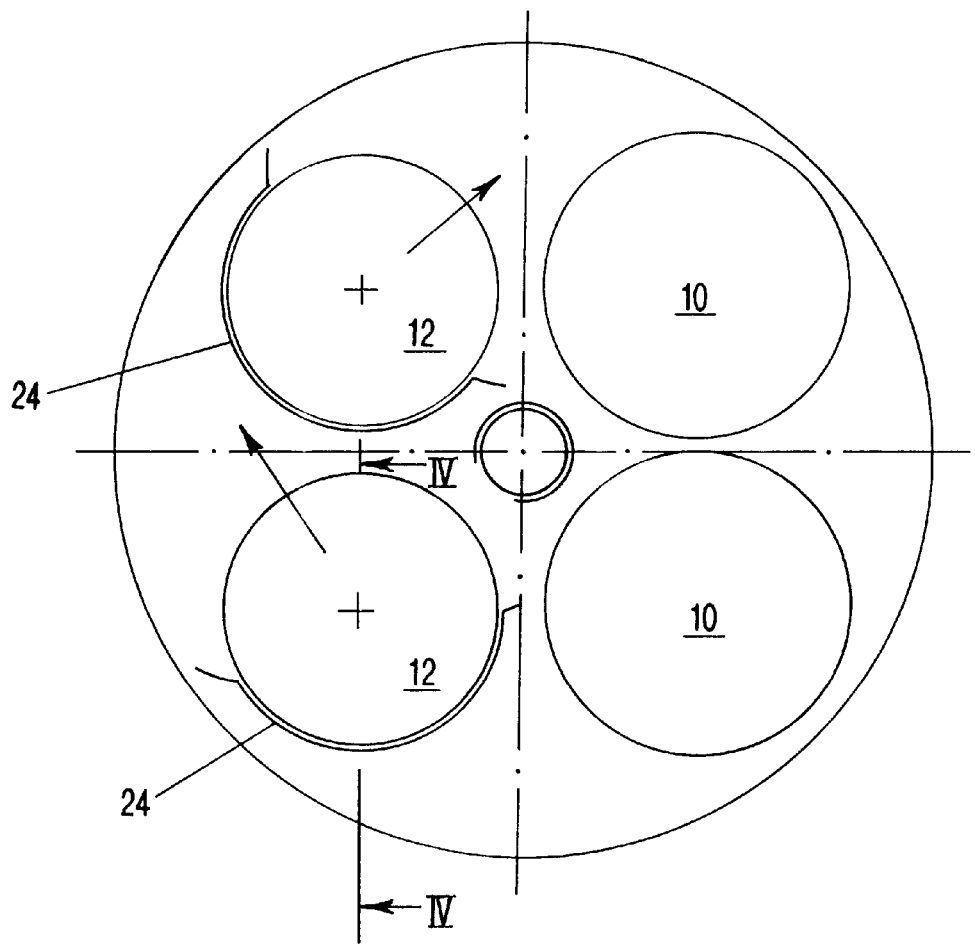
FIG. 3 is a view onto a cylinder head from the piston.
Figure 4:
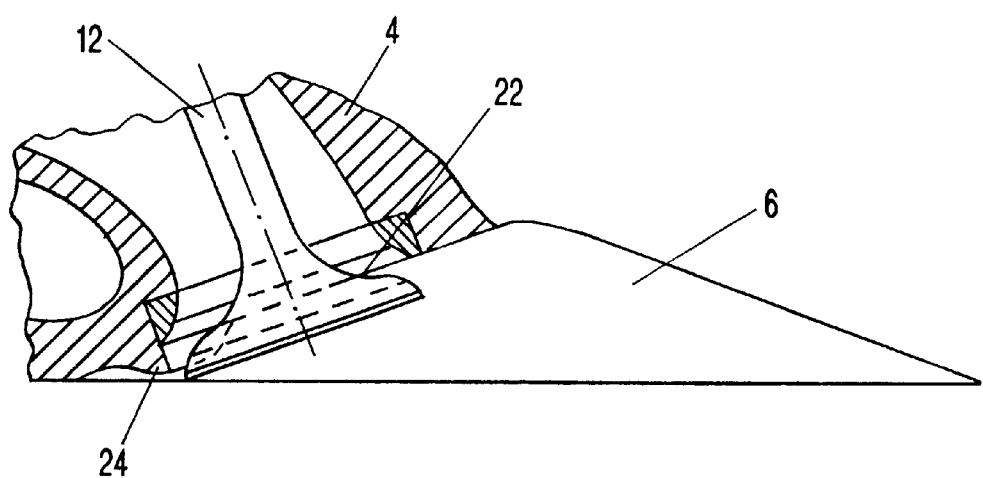
FIG. 4 is a detail view in cross-section taken along line IV—IV through the cylinder head in FIG. 3.

That backflow is used deliberately by virtue of the exhaust valve seat being for example of the configuration as shown in FIGS. 3 and 4.

FIG. 3 is a view from below of part of a cylinder head with two inlet valves 10 and two exhaust valves 12 per cylinder.

FIG. 4 is a view in section taken along line IV—IV in FIG. 3, with the exhaust valve 12 lifted open, although the section through the inlet valve 10 is not shown for the sake of clarity of the drawing.

As can be seen the cylinder head 4 is provided around a part of the periphery of the exhaust valve seat 22 with a screening or shielding 24 which prolongs the seat into the combustion chamber 6, parallel to the direction of movement of the valve 12. The screening 24 reduces the through-flow cross-section between the exhaust valve 12 and the adjacent wall of the cylinder head 4, over a part of the valve lift. In that respect, as can be seen from FIG. 3, the screening 24 is of such a configuration over a respective peripheral region of the exhaust valve seat 22 that an increased through-flow cross-section is available in a peripheral direction of the combustion chamber around an axis defining the direction of movement of the piston, so that, in the event of an exhaust gas backflow, there is an intake flow substantially in the direction of the arrows illustrated in FIG. 3. The respective screening 24 can extend for example along about 180° of the periphery of the respective exhaust valve seat 22, with the ends of the screenings 24, being given by a respective radius of the combustion chamber.

The above-described arrangement provides that, in the low-load range, when the butterfly valve 20 is substantially closed, the exhaust gas backflow forms a swirl flow which extends around the combustion chamber 6 in the peripheral direction thereof around the axis of the piston movement and which surrounds or encloses the incoming flow of fresh charge and concentrates it into the central region of the combustion chamber 6 in which the sparkplug 8 is arranged. That provides for a considerable improvement in the capacity for using a lean mixture, and a considerable improvement in residual gas compatibility, while combustion speed is increased and hydrocarbon emissions and the cooling water losses are reduced. The level of fuel consumption of the internal combustion engine is reduced, with at the same time an improvement in emission characteristics.

In contrast to the charge movement being influenced, in per se known manner, by way of the incoming flow of fresh charge, the exhaust gas backflow as described above only occurs in the low-load range so that there are no disadvantageous effects whatsoever in regard to the full-load range, as occur in the known procedure for influencing the charge movement by way of the incoming flow of fresh charge.

It will be appreciated that the above-described embodiment of the invention has been set forth solely by way of example and the invention can be modified in many ways without thereby departing from the spirit and scope of the invention. For example the reduced pressure in the combustion chamber does not have to be produced by way of a butterfly valve, but can be produced directly by influencing the opening functions of the inlet and/or exhaust valve. For certain uses, it may be advantageous for the exhaust valve to be deliberately kept open longer than is shown in FIG. 2, by virtue of being able to suitably influence the opening functions of the valves. The screening portions 24 and/or shield means which are mounted on the stem of the exhaust valve could also be of such a configuration that a tumble flow is produced in the combustion chamber, if that is advantageous with a suitable valve configuration, and the position of the sparkplug and the injection nozzle. The invention is not limited to use in Otto-cycle engines but can also be used in diesel engines. In the case of engines having a plurality of exhaust valves per cylinder, it may be sufficient to provide only one thereof with a screening means. Furthermore, in the case of engines with a plurality of exhaust valves per cylinder, wherein the exhaust valves are of an asymmetrical configuration with respect to a plane passing through their axis and the axis of the cylinder, then, to produce a directed exhaust gas backflow into the combustion chamber, it may also be sufficient to actuate only one of the exhaust valves, as the asymmetry then results in a suitable orientation of the backflow.

What is claimed is:

1. A method of improving combustion characteristics of a four-stroke internal combustion engine, wherein the internal combustion engine comprises a cylinder with a combustion chamber, an inlet valve, and an exhaust valve; a piston reciprocatingly moveable in the cylinder and delimiting one end of the combustion chamber; an induction device and an exhaust device; said method comprising the steps of:

a) opening the inlet valve to provide communication between the combustion chamber and the induction device during the intake stroke of the engine;

b) temporarily closing the exhaust valve, provided to temporarily provide communication between the combustion chamber and the exhaust device, for terminating an exhaust stroke of the engine after the piston has reached the top dead center;

c) providing a flow passage along the at least partially open exhaust valve, wherein in the low load range of the engine, after exhausting of the exhaust gas, an exhaust gas backflow is directed into the combustion chamber such that the exhaust gas backflow rotates about an axis and forms an exhaust gas envelope surrounding the combustion chamber;

d) introducing a fresh charge into a radially inner region of the exhaust gas envelope rotating about the axis so that the fresh charge is thus separated by the exhaust gas envelope from the combustion chamber wall at the time of combustion.

2. A method according to claim 1, wherein in the combustion chamber the exhaust gas backflow forms a swirl flow about the axis of the cylinder.

3. A method according to claim 1, wherein in said step a) the inlet valve is opened before the top dead center so that around the top dead center the inlet valve and the outlet valve are open simultaneously and that a vacuum is generated upstream of the inlet valve in the low load range.

4. A four stroke internal combustion engine comprising:

a cylinder having a combustion chamber, at least one inlet valve, and at least one exhaust valve;

a piston reciprocatingly moveable in said cylinder and delimiting one end of said combustion chamber;

an induction device, wherein said at least one inlet valve temporarily provides communication between said combustion chamber and said induction device;

an exhaust device, wherein said at least one exhaust valve temporarily provides communication between said combustion chamber and said exhaust device;

said at least one exhaust valve having a valve seat;

a means for opening and closing said at least one exhaust valve and said at least one inlet valve such that said exhaust valve is closed for terminating the exhaust stroke only after the piston has reached the top dead center;

said exhaust valve having a flow passage along said valve seat, when said exhaust valve is partially opened, for directing the exhaust gas backflow into said combustion chamber such that the exhaust gas backflow rotates about an axis and forms an exhaust gas envelope surrounding the combustion chamber.

5. An internal combustion engine according to claim 4, comprising a butterfly valve positioned upstream of said at least one inlet valve for generating a vacuum in the low load range, wherein said means for opening and closing is embodied such that said at least one inlet valve is opened for the intake stroke before said piston has reached the top dead center.

6. An internal combustion engine according to claim 4, wherein said valve seat has a periphery and includes a shield, extending about a part of said periphery, for reducing a flow cross-section through said flow passage for a short valve lift, wherein said shield opens in a peripheral direction of said combustion chamber, said peripheral direction extending about an axis of piston movement.

7. An internal combustion engine according to claim 6, comprising two of said exhaust valves, wherein said shields open in the same direction.

\* \* \* \* \*